(12) United States Patent
Yi

(10) Patent No.: US 7,664,330 B2
(45) Date of Patent: Feb. 16, 2010

(54) GRAPHIC IMAGE DATA COMPRESSOR AND METHOD OF COMPRESSING GRAPHIC IMAGE DATA

(75) Inventor: Young-pum Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 830 days.

(21) Appl. No.: 11/334,006

(22) Filed: Jan. 18, 2006

(65) Prior Publication Data

US 2006/0159358 A1 Jul. 20, 2006

(30) Foreign Application Priority Data

Jan. 18, 2005 (KR) .................... 10-2005-0004488

(51) Int. Cl.
*G06K 9/36* (2006.01)
(52) U.S. Cl. .................... 382/232; 382/244; 382/245
(58) Field of Classification Search ............... 382/232, 382/239, 240, 238, 245, 234, 244; 375/E7.093, 375/E7.144; 348/441; 370/202; 341/60; 709/247, 203
See application file for complete search history.

(56) References Cited

U.S. PATENT DOCUMENTS

| 6,400,289 | B1 * | 6/2002 | Banerji | .................. 341/60 |
|---|---|---|---|---|
| 7,177,479 | B2 * | 2/2007 | De Ponti et al. | ............ 382/245 |
| 2002/0101367 | A1 | 8/2002 | Geiger et al. | .................. 341/51 |

FOREIGN PATENT DOCUMENTS

| JP | 2002-335404 | 11/2002 |
|---|---|---|
| JP | 2003-087573 | 3/2003 |
| KR | 2001-0017322 | 3/2001 |
| KR | 2003-0051021 | 6/2003 |

\* cited by examiner

*Primary Examiner*—Anh Hong Do
(74) *Attorney, Agent, or Firm*—F. Chau & Associates, LLC

(57) ABSTRACT

Provided are a graphic image data compressor that provides a complete image instead of an erroneous image when graphic image data fails to be compressed to satisfy its bandwidth and a method of compressing graphic image data using the same, where the graphic image data compressor includes a compression block for compressing received graphic image data using a loss compression algorithm and a lossless compression algorithm and controlling an amount of loss data in the loss and lossless compression algorithms, and a compressed data determination block for comparing a compression rate of data compressed according to the loss and lossless compression algorithms with an established compression rate, selecting optimum compressed data, and determining to output the selected compressed data or the graphic image data.

24 Claims, 4 Drawing Sheets

GRAPHIC IMAGE DATA COMPRESSOR AND METHOD OF COMPRESSING GRAPHIC IMAGE DATA

CROSS-REFERENCE TO RELATED APPLICATION

This application claims foreign priority under 35 U.S.C. §119 to Korean Patent Application No. 10-2005-0004488, filed on Jan. 18, 2005, in the Korean Intellectual Property Office, the disclosure of which is incorporated herein by reference in its entirety.

BACKGROUND OF THE INVENTION

1. Field of the Invention

The present disclosure relates to graphic image data compression, and more particularly, to graphic image data compressors using an effective loss compression algorithm in a system with a restricted bandwidth, and a method of compressing graphic image data.

2. Description of the Related Art

Digital broadcasting is distinguished from analog broadcasting in that relatively numerous types of services can be provided to users. Users expect the digital broadcasting to provide pictures with good quality. Since a receiver performs a variety of functions including a display of graphic image data, the graphic image data have restricted bandwidths.

Digital broadcasting data may be stored in a memory included in the receiver and transmitted to necessary function blocks by a controller using ground waves. Graphic image data included in the ground waves are stored in the memory and transmitted by the controller to a display device, such as a monitor. Among various service function blocks of the receiver, function blocks used to process graphic image data relevant to the present disclosure will now be described.

FIG. 1 is a block diagram illustrating a digital receiver for processing graphic image data. Referring to FIG. 1, the digital receiver 100 includes a CPU 110, a graphic processor 120, a memory 130, a display processor 140, and a monitor 150. Graphic image data are transmitted to the function blocks of the digital receiver 100 through a bus embedded therein.

The graphic processor 120 transmits graphic image data to the memory 130 through the bus under the control of the CPU 110. The display processor 140 transmits the graphic image data stored in the memory 130 to the monitor 150 through the bus. The monitor 150 displays the graphic image data.

Each data of various services performed by the digital receiver has a restricted bandwidth. Graphic image data also have restricted bandwidths. Since more graphic image data are processed than service data, graphic image data are compressed and stored in the memory.

FIG. 2 is a block diagram illustrating a conventional digital receiver for compressing and storing graphic image data. Referring to FIG. 2, the digital receiver 200 includes a CPU 210, a graphic processor 220, a compressor 230, a memory 240, a de-compressor 250, a display processor 260, and a monitor 270. Since the digital receiver 200 additionally includes the compressor 230 and the de-compressor 250 as compared with the digital receiver 100 shown in FIG. 1, the compressor 230 and the de-compressor 250 will now be described.

The compressor 230 compresses graphic image data received from the graphic processor 220 to a smaller data stream using a predetermined algorithm and stores the compressed data in the memory 240 through a bus. The de-compressor 250 decompresses the compressed data read from the memory 240 and transmits the decompressed data to the monitor 270 to display the data.

A process of compressing and decompressing graphic image data may cause a loss of compressed data. To avoid such loss, lossless compression methods such as Run Length Encoding (RLE) and Differential Pulse Code Modulation (DPCM) are widely used. Here, a loss compression method can be used for a system capable of dealing with the data loss in order to equally process other data.

Graphic image data typically have different compression rates according to the kinds of graphic images. A graphic image with little change can have a very high compression rate, while a compressed graphic image with many changes may be larger than an uncompressed graphic image.

A data bandwidth between the memory 240 and the display processor 260 becomes much narrower due to a data bit width of the memory 240 and an operation frequency of the digital receiver providing various kinds of services. In this case, graphic image data must be compressed with a high compression rate to satisfy its bandwidth. If compression fails, conventional image pixel data may be repeatedly displayed or a current image may be skipped.

SUMMARY OF THE INVENTION

The present disclosure provides a graphic image data compressor providing a complete image instead of an erroneous image when graphic image data fails to be compressed according to its bandwidth.

The present disclosure also provides a method of compressing graphic image data that provides a complete image instead of an erroneous image when graphic image data fails to be compressed according to its bandwidth.

According to an aspect of the present disclosure, there is provided a graphic image data compressor, including a compression block compressing received graphic image data using a loss compression algorithm and a lossless compression algorithm and controlling an amount of loss data in the loss and lossless compression algorithms, and a compressed data determination block comparing a compression rate of data compressed according to the loss and lossless compression algorithms with an established compression rate, selecting optimum compressed data, and determining to output the selected compressed data or the graphic image data.

According to another aspect of the present disclosure, there is provided a graphic image data compressor including a compression block compressing received graphic image data using a loss compression algorithm and a lossless compression algorithm in response to a control signal and controlling an amount of loss data in the loss and lossless compression algorithms, and a compressed data determination block comparing a compression rate of data compressed according to the loss and lossless compression algorithms with an established compression rate, selecting optimum compressed data, determining to output the selected compressed data or the graphic image data, and outputting the control signal for instructing which algorithm is used to compress the graphic image data by the compression block and a loss rate of a loss compression algorithm.

According to yet another aspect of the present disclosure, there is provided a method of compressing graphic image data, including compressing received graphic image data using a loss compression algorithm and/or a lossless compression algorithm, and selecting optimum compressed data by comparing a compression rate of the compressed data with an established compression rate wherein an amount of loss data in the loss compression algorithm and/or the lossless compression algorithm is adjusted.

According to still another aspect of the present disclosure, there is provided a method of compressing graphic image data, including RLE compressing received graphic image data using an RLE compression algorithm, first comparing a compression rate of the compressed data with an established compression rate and, when the compression rate of the compressed data is higher than the established compression rate, outputting the compressed data, comparing the compression rate of the compressed data as a result of the first comparing operation with the established compression rate and, when the compression rate of the compressed data is lower than the established compression rate, RLEL compressing the compressed data using an RLEL compression algorithm, second comparing a compression rate of the data compressed using the RLEL compression algorithm with the established compression rate and, when the compression rate of the compressed data is higher than the established compression rate, outputting the compressed data, and comparing the compression rate of the data compressed using the RLEL compression algorithm with the established compression rate as a result of the second comparing operation and, when the compression rate of the compressed data is lower than the established compression rate, compressing and outputting the compressed data using a TRUNC compression algorithm, wherein an amount of loss data in the RLEL compression algorithm and the TRUNC compression algorithm is adjusted.

BRIEF DESCRIPTION OF THE DRAWINGS

The above and other features and advantages of the present disclosure will become more apparent by describing in detail exemplary embodiments thereof with reference to the attached drawings, in which.

DETAILED DESCRIPTION OF PREFERRED EMBODIMENTS

Figure 1:
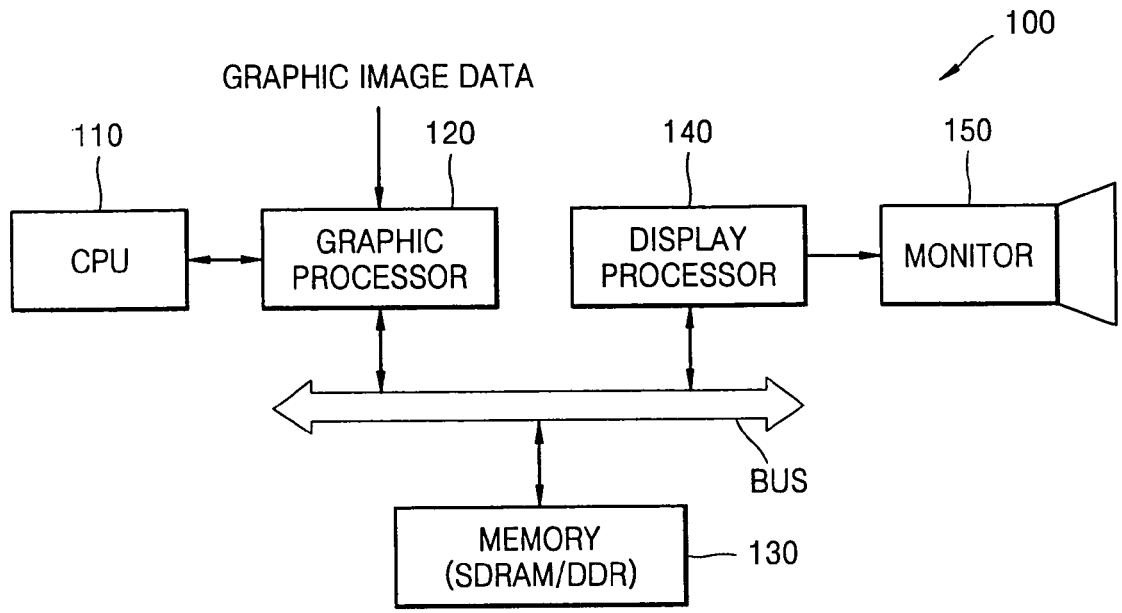
FIG. 1 is a block diagram illustrating a digital receiver for processing graphic image data.
Figure 2:
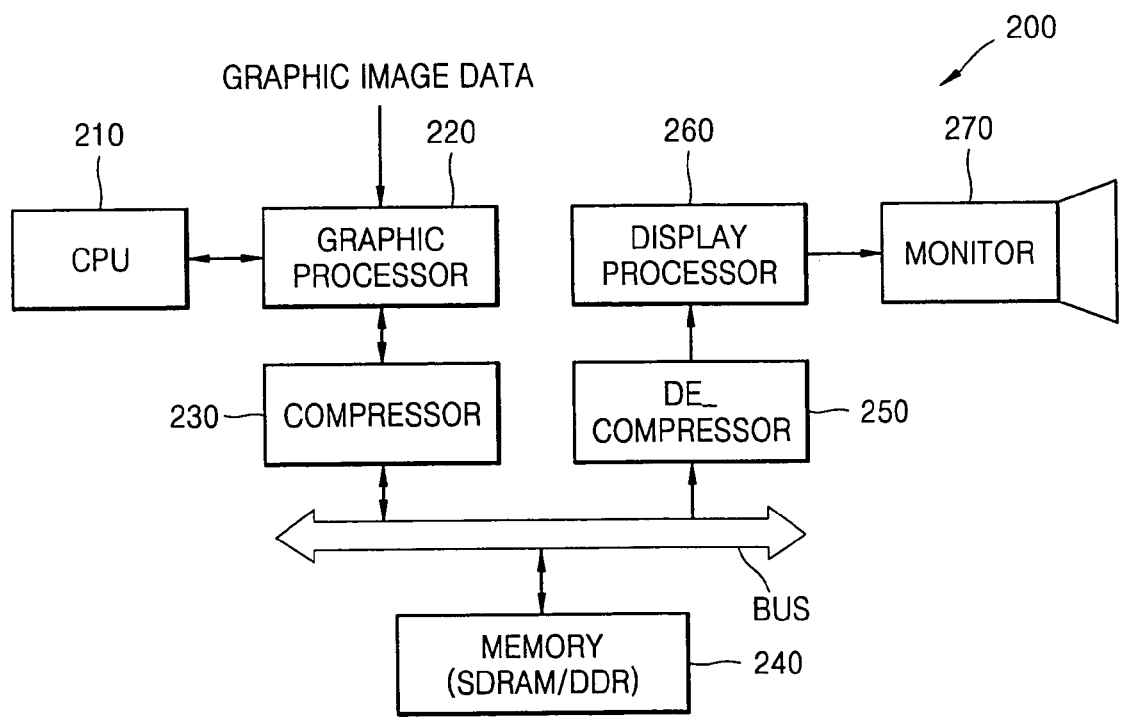
FIG. 2 is a block diagram illustrating a conventional digital receiver for compressing and storing graphic image data.

The present disclosure will now be described more fully with reference to the accompanying drawings, in which exemplary embodiments of the disclosure are shown. Like reference numerals in the drawings may be used to denote like elements.

Figure 3:
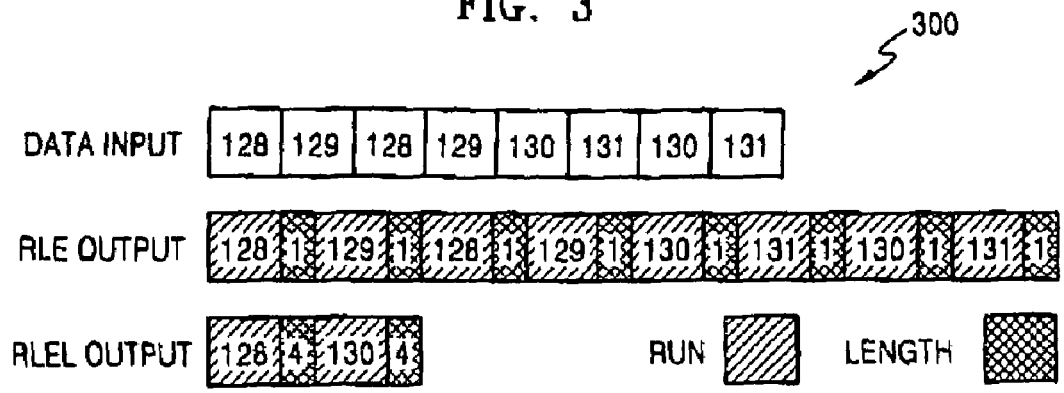
FIG. 3 illustrates graphic image data used to explain basic principles of a graphic image data compressor according to an embodiment of the present disclosure.

FIG. 3 illustrates graphic image data, indicated generally by the reference numeral 300, used to illustrate basic principles of a graphic image data compressor according to an embodiment of the present disclosure. Referring to FIG. 3, when graphic image data having eight blocks 128, 129, 128, 129, 130, 131, 130, and 131, respectively, are input, a Run Length Encoding (RLE) compression algorithm needs eight Runs and eight Lengths, while a Run Length Encoding Lossy (RLEL) compression algorithm needs one Run and one Length.

The RLE compression algorithm replaces sequences of the same data (Run) by a count number (Length). Since a first block has data 128 and an adjacent block has data 129, two blocks are determined to have different data, and Run 128 is replaced by one Length. As such, when the same data are repeating by comparing data of adjacent blocks, the count number (Length) of the repetitive data blocks is encoded.

The RLEL compression algorithm compresses graphic image data regardless of a Least Significant Bit (LSB) of the graphic image data. Regardless of a differential value of 1 between a reference first block value 128 and an adjacent block value 129, the adjacent block value 129 is recognized to be substantially equal to the reference first block value 128. Regardless of a differential value of 1 between a reference fifth block value 130 and an adjacent block value 131, the adjacent block value 131 is recognized to be substantially equal to the reference fifth block value 130. Four block values 128 are determined to be repeating and four block values 130 are determined to be repeating to encode data. In this case, if data is compressed regardless of a differential value of 1 between blocks, an image quality of the compressed data deteriorates by the differential value of 1. If a differential value is more than 2, the image quality of the compressed data may be considered to deteriorate considerably.

While a low compression rate causes conventional image pixel data to be repeatedly displayed or a current image to be skipped, it is more effective to display a repetitive picture even though an image quality of the picture deteriorates.

Figure 4:
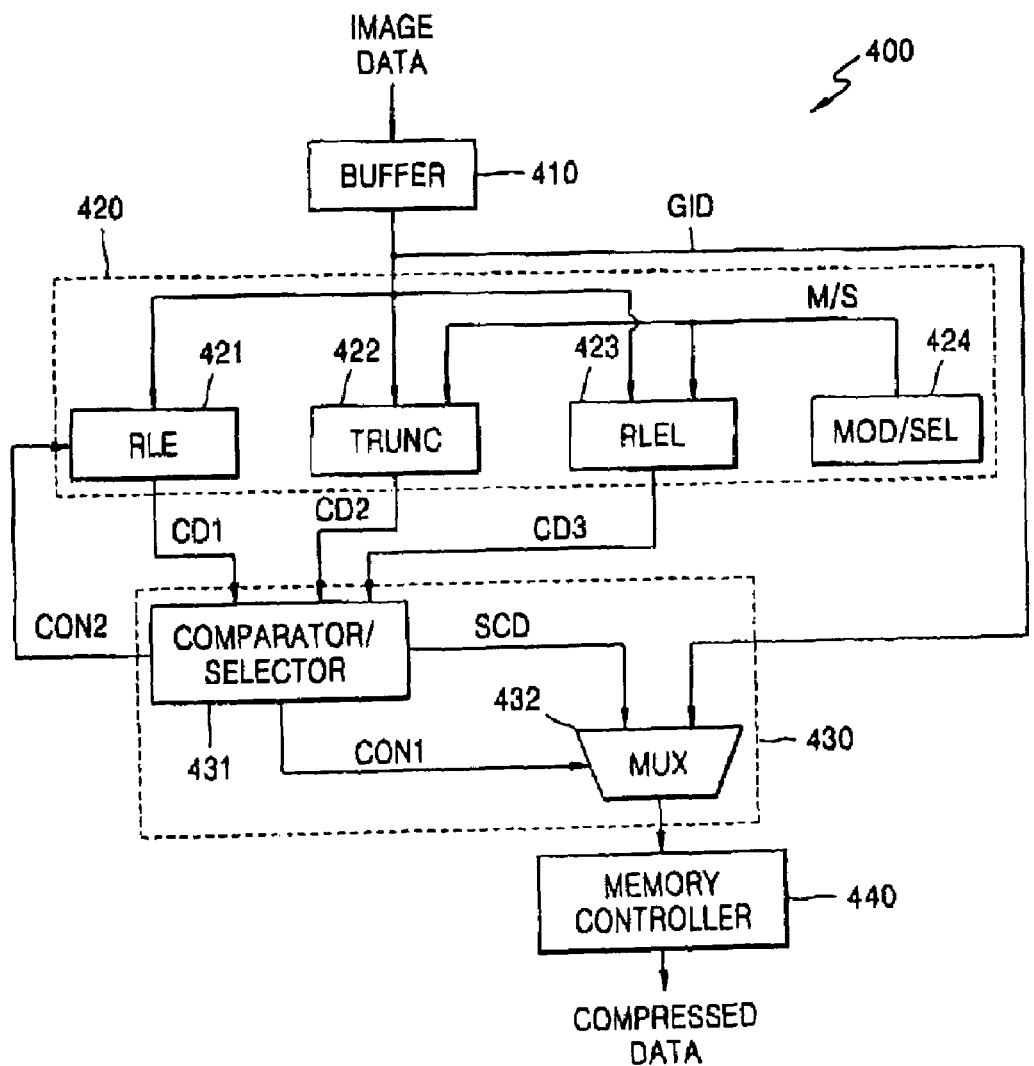
FIG. 4 is a block diagram illustrating a graphic image data compressor according to an embodiment of the present disclosure.

FIG. 4 is a block diagram illustrating a graphic image data compressor, indicated generally by the reference numeral 400, according to an embodiment of the present disclosure. Referring to FIG. 4, the graphic image data compressor includes a buffer 410, a compression block 420, a compressed data determination block 430, and a memory controller 440.

The buffer 410 receives and stores graphic image data. The compression block 420, which includes an RLE block 421, a TRUNC block 422, an RLEL block 423, and a mode selector 424, compresses the received graphic image data using a loss compression algorithm and a lossless compression algorithm and controls an amount of loss data in the loss and lossless compression algorithms.

The RLE block 421 performs the lossless compression algorithm for the graphic image data (GID) stored in the buffer 410 and outputs compressed data CD1. The TRUNC block 422 performs the loss compression algorithm for the GID stored in the buffer 410 in response to a mode selection signal M/S and outputs compressed data CD2.

The RLEL block 423 performs the loss compression algorithm for the GID stored in the buffer 410 in response to the mode selection signal M/S and outputs compressed data CD3. The loss compression algorithm performed by the RLEL block 423 compresses graphic image data by truncating the LSB of the graphic image data. The mode selector 424 outputs the mode selection signal M/S for determining an amount of loss data in the lossless and loss compression algorithms, which will be described with reference to FIG. 5.

The compressed data determination block 430 compares compression rates of the CD1 to CD3 output by the compression block 420 with an established compression rate, selects optimum compressed data, and outputs the selected compressed data SCD or GID. Uncompressed GID are stored in a memory in order to use the present embodiment when a system does not require to compress the GID due to a quite wide bandwidth.

The compressed data determination block 430 includes a comparator/selector 431 and a multiplexer 432. The comparator/selector 431 compares compression rates of the CD1 to CD3 output by the compression block 420 with an established compression rate, selects optimum compressed data, and outputs a selection signal CON1 for instructing to output the SCD or the GID.

The comparator/selector 431 enables to generate a control signal CON2 for controlling blocks including the compression block 420 and determining operations of necessary blocks. To be more specific, after the comparator/selector 431 compares compression rates of the CD1 to CD3 obtained by first operating the RLE block 421 and the RLEL block 423 and, the comparison result does not satisfy a desired condition, it compares a compression rate of the CD2 obtained by operating the TRUNC block 422. Such a process reduces power consumption since multiple blocks including the compression block 420 do not simultaneously perform operations. The multiplexer 432 outputs the SCD or the GID in response to the selection signal CON 1. The memory controller 440 stores the data received through the multiplexer 432 in a memory (not shown).

Figure 5:
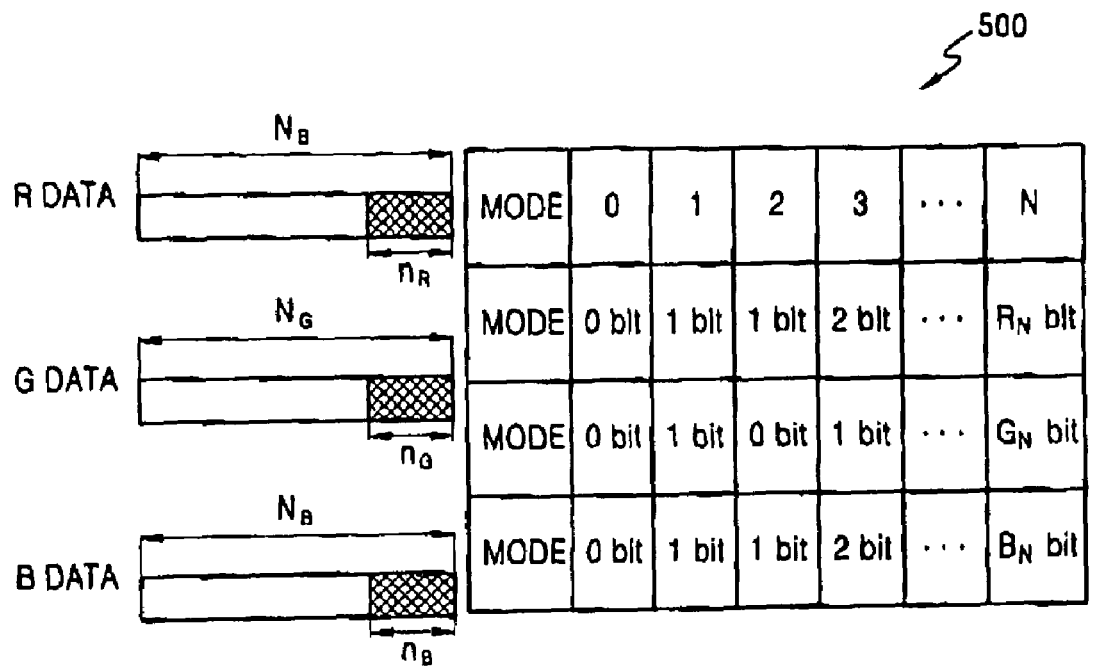
FIG. 5 illustrates an amount of loss data determined by the mode selection signal M/S of FIG. 4.

FIG. 5 illustrates an amount of loss data determined by the mode selection signal M/S and indicated generally by the reference numeral 500. Referring to FIG. 5, each amount of loss data representing three colors of Red (R), Green (G), and Blue (B) is adjusted. Such an adjustment can be made by a receiver manufacturer based on user's requirements and conditions, or by a user. $N_R$, $N_G$, and $N_B$ denote actual data lengths, and $n_R$, $n_G$, and $n_B$ denote discarded or deleted data lengths.

A mode signal 0 designates data coding without loss and a mode signal 1 designates data coding with a loss of one bit. A mode signal 3 designates data coding with losses of one bit in the R data, one bit in the G data, and two bits in the B data in that such a designation differs according to a data color. A mode signal N is considered to have a loss by each bit $R_N$, $G_N$, and $B_N$.

Figure 6:
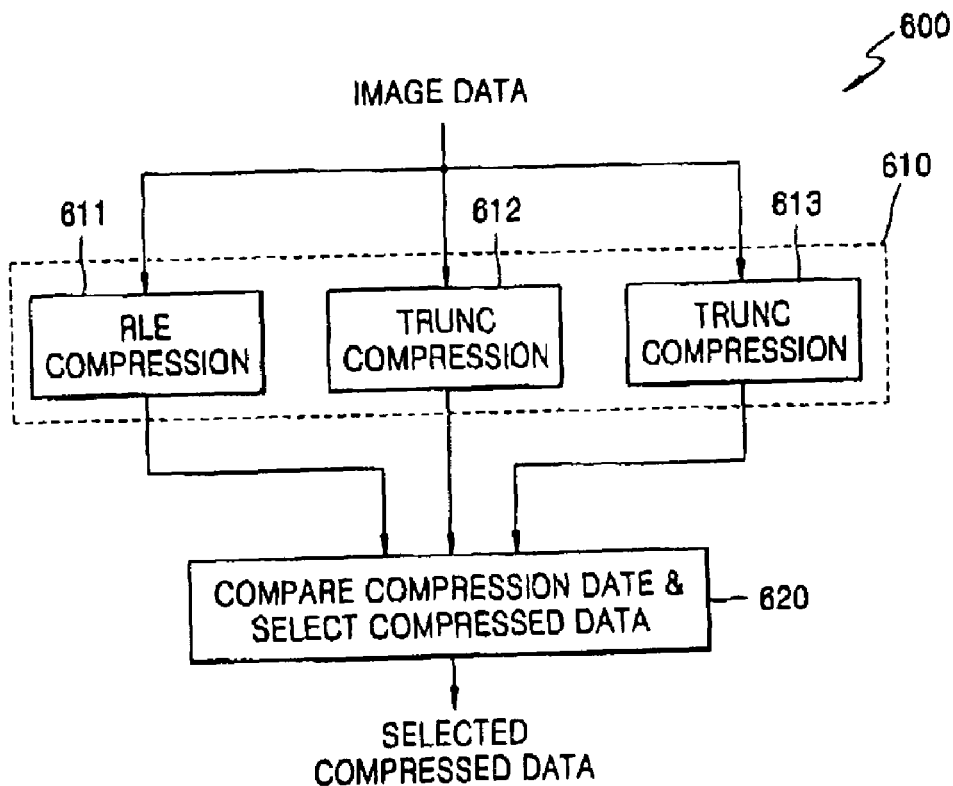
FIG. 6 is a flowchart illustrating a method of compressing graphic image data according to an embodiment of the present disclosure.

FIG. 6 is a flowchart illustrating a method of compressing graphic image data according to an embodiment of the present disclosure and indicated generally by the reference numeral 600. Referring to FIG. 6, graphic image data is compressed (Operation 610) and the compressed data is selected (Operation 620).

In Operation 610, received graphic image data is RLE compressed (Operation 611) using a lossless compression algorithm, TRUNC compressed (Operation 612), and RLEL compressed (Operation 613) using a loss compression algorithm. In Operation 612, received graphic image data are compressed by truncating the LSB of the graphic image data. In Operation 613, received graphic image data are compressed regardless of an LSB of the graphic image data. An amount of loss data in the loss and lossless compression algorithms can be adjusted, which is described with reference to FIG. 5. In Operation 620, a compression rate of the data compressed in Operation 610 is compared with an established compression rate and optimum compressed data are selected.

Figure 7:
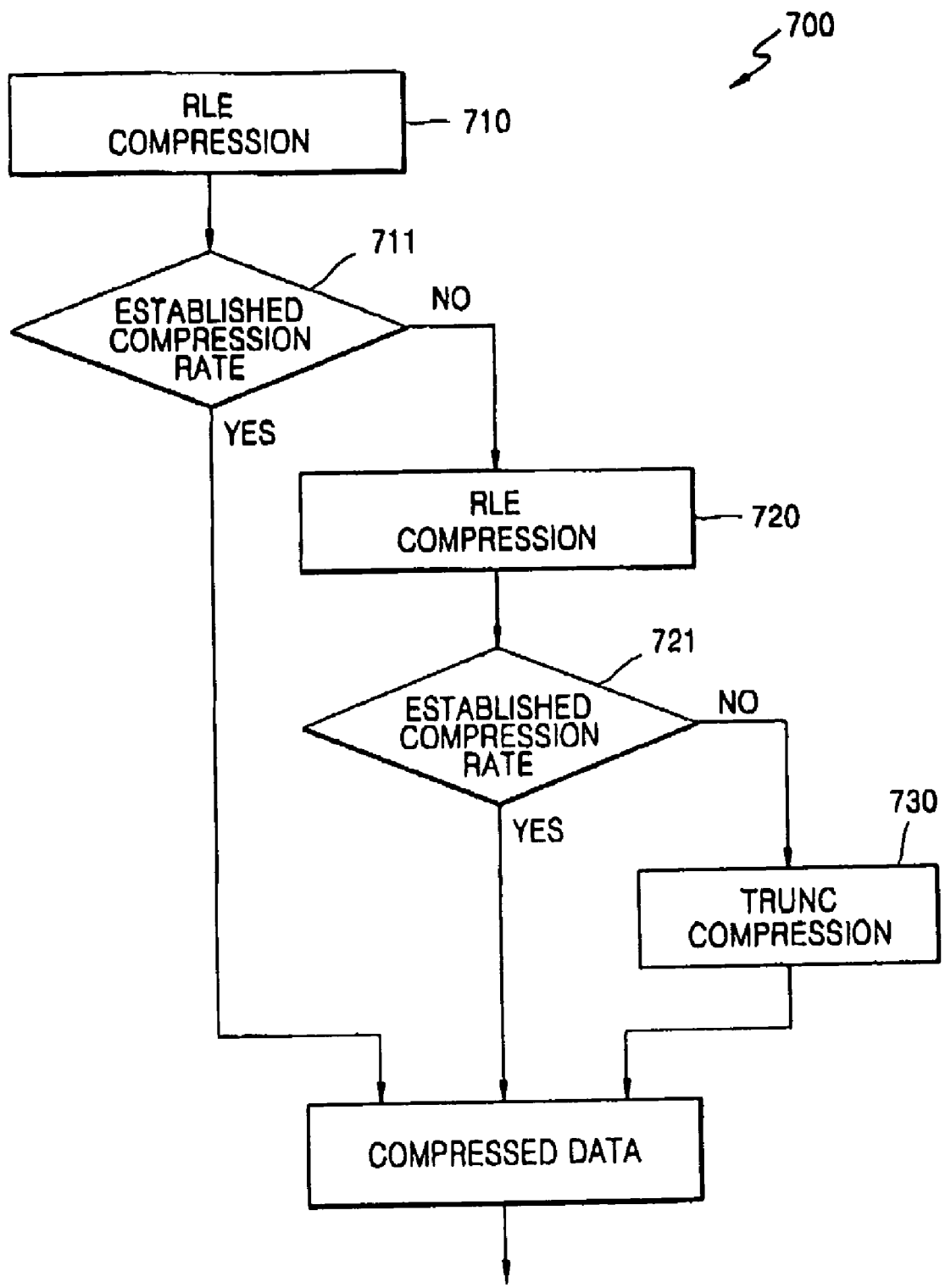
FIG. 7 is a flowchart illustrating a method of compressing graphic image data according to another embodiment of the present disclosure.

FIG. 7 is a flowchart illustrating a method of compressing graphic image data according to another embodiment of the present disclosure and indicated generally by the reference numeral 700. Referring to FIG. 7, graphic image data is RLE compressed (Operation 710), first compared (Operation 711), RLEL compressed (Operation 720), second compared (Operation 721), and TRUNC compressed (Operation 730).

In Operation 710, received graphic image data are RLE compressed using an RLE compression algorithm. In Operation 711, a compression rate of the data compressed in Operation 710 is compared with an established compression rate and, when the compression rate of the compressed data is higher than the established compression rate, the compressed data 740 are output.

In Operation 720, the compression rate of the compressed data according to a result of Operation 711 is compared with the established compression rate and, when the compression rate of the compressed data is lower than the established compression rate, the graphic image data are compressed using an RLEL compression algorithm. In Operation 721, when a compression rate of the data compressed in Operation 720 is higher than the established compression rate, the compressed data 740 are output.

In Operation 730, when a compression rate of the data compressed in Operation 720 is lower than the established compression rate according to the result of Operation 721, the graphic image data are compressed using a TRUNC compression algorithm. An amount of loss data in the RLEL and TRUNC compression algorithms can be adjusted, which is described with reference to FIG. 5.

The RLEL compression algorithm compresses graphic image data regardless of an LSB of the graphic image data, and the TRUNC compression algorithms compresses graphic image data by truncating the LSB of the graphic image data. The graphic image data compressor and the method of compressing graphic image data can be applied to a system with a variable compression rate and a narrow data bandwidth, and select a simple and effective compression rate.

While the present invention has been particularly shown and described with reference to exemplary embodiments thereof, it will be understood by those of ordinary skill in the pertinent art that various changes in form and details may be made therein without departing from the spirit and scope of the present disclosure as defined by the following claims.

What is claimed is:

1. A graphic image data compressor, comprising:
   a compression block compressing received graphic image data using a loss compression algorithm and a lossless compression algorithm and controlling an amount of loss data in the loss and lossless compression algorithms; and
   a compressed data determination block comparing a compression rate of data compressed according to the loss and lossless compression algorithms with an established compression rate, selecting optimum compressed data, and determining to output the selected compressed data or the graphic image data.

2. The graphic image data compressor according to claim 1, further comprising a buffer receiving and storing the graphic image data and transmitting the stored graphic image data to the compression block and the compressed data determination block.

3. The graphic image data compressor according to claim 1, further comprising a memory controller controlling output data of the compressed data determination block to be stored in a memory.

4. The graphic image data compressor according to claim 1, wherein the compression block comprises:
   a Run Length Encoding (RLE) block performing the lossless compression algorithm for the graphic image data;
   a mode selector outputting a mode selection signal for determining an amount of loss data in the loss compression algorithm;

a Run Length Encoding Lossy (RLEL) block performing a first loss compression algorithm for the graphic image data in response to the mode selection signal; and a TRUNC block performing a second loss compression algorithm for the graphic image data in response to the mode selection signal.

5. The graphic image data compressor according to claim 4, wherein the first loss compression algorithm compresses graphic image data regardless of a Least Significant Bit (LSB) of the graphic image data.

6. The graphic image data compressor according to claim 4, wherein the second loss compression algorithm compresses graphic image data by truncating the LSB of the graphic image data.

7. The graphic image data compressor according to claim 4, wherein the mode selection signal determines an amount of loss data when the graphic image data constituting three colors of Red (R), Green (G), and Blue (B) are compressed.

8. The graphic image data compressor according to claim 1, wherein the compressed data determination block comprises:
a comparator/selector comparing a compression rate of output data of the compression block with an established compression rate, selecting and outputting optimum compressed data, and outputting a selection signal; and
a multiplexer outputting the selected compressed data or the graphic image data in response to the selection signal.

9. The graphic image data compressor according to claim 8, wherein the compressed data determination block further comprises a flag signal having information on an algorithm used for the selected compressed data,
wherein the flag signal is output from the comparator/selector.

10. A graphic image data compressor, comprising:
a compression block compressing received graphic image data using a loss compression algorithm and a lossless compression algorithm in response to a control signal and controlling an amount of loss data in the loss and lossless compression algorithms; and
a compressed data determination block comparing a compression rate of data compressed according to the loss and lossless compression algorithms with an established compression rate, selecting optimum compressed data, determining to output the selected compressed data or the graphic image data, and outputting the control signal for instructing which algorithm is used to compress the graphic image data by the compression block and a loss rate of a loss compression algorithm.

11. The graphic image data compressor according to claim 10, wherein the compression block comprises:
an RLE block performing a lossless compression algorithm for the graphic image data in response to the control signal;
a mode selector outputting a mode selection signal for determining an amount of loss data in the loss compression algorithm in response to the control signal;
an RLEL block performing a first loss compression algorithm for the graphic image data in response to the control signal and the mode selection signal; and
a TRUNC block performing a second loss compression algorithm for the graphic image data in response to the control signal and the mode selection signal.

12. The graphic image data compressor according to claim 11, wherein the control signal gives a first instruction to compress the graphic image data in the RLE block and the RLEL block and a second instruction to operate the TRUNC block.

13. The graphic image data compressor according to claim 11, wherein the first loss compression algorithm compresses graphic image data regardless of an LSB of the graphic image data.

14. The graphic image data compressor according to claim 11, wherein the second loss compression algorithm compresses graphic image data by truncating the LSB of the graphic image data.

15. The graphic image data compressor according to claim 11, wherein the mode selection signal determines an amount of loss data when the graphic image data constituting three colors of Red (R), Green (G), and Blue (B) are compressed.

16. The graphic image data compressor according to claim 10, wherein the compressed data determination block comprises:
a comparator/selector comparing a compression rate of output data of the compression block with an established compression rate, selecting and outputting optimum compressed data, and outputting a selection signal and the control signal; and
a multiplexer outputting the selected compressed data or the graphic image data in response to the selection signal.

17. The graphic image data compressor according to claim 16, wherein the compressed data determination block further comprises a flag signal having information on an algorithm used for the selected compressed data,
wherein the flag signal is output from the comparator/selector.

18. A graphic image data compressor comprising:
compression means for compressing received graphic image data using a loss compression algorithm and/or a lossless compression algorithm; and
selection means for selecting optimum compressed data by comparing a compression rate of the compressed data with an established compression rate,
wherein an amount of loss data in the loss compression algorithm and/or the lossless compression algorithm is adjusted.

19. The graphic image data compressor according to claim 18, wherein the compressing operation uses a Run Length Encoding (RLE) algorithm as the lossless compression algorithm and a Run Length Encoding Lossy (RLEL) algorithm and a TRUNC algorithm as the loss compression algorithm.

20. The graphic image data compressor according to claim 19, wherein the RLEL algorithm compresses graphic image data regardless of a Least Significant Bit (LSB) of the graphic image data.

21. The graphic image data compressor according to claim 19, wherein the TRUNC algorithm compresses graphic image data by truncating the LSB of the graphic image data.

22. A compressing graphic image data compressor comprising:
Run Length Encoding (RLE) compression means for compressing received graphic image data using an RLE compression algorithm;
first compressed data output means for comparing a compression rate of the compressed data with an established compression rate and, when the compression rate of the compressed data is higher than the established compression rate, outputting the compressed data;
Run Length Encoding Lossy (RLEL) compression means for comparing the compression rate of the compressed data as a result of the first comparing operation with the established compression rate and, when the compression rate of the compressed data is lower than the established compression rate, RLEL compressing the compressed data using an RLEL compression algorithm;

second compressed data output means for comparing a compression rate of the data compressed using the RLEL compression algorithm with the established compression rate and, when the compression rate of the compressed data is higher than the established compression rate, outputting the compressed data; and TRUNC compression means for comparing the compression rate of the data compressed using the RLEL compression algorithm with the established compression rate as a result of the second comparing operation and, when the compression rate of the compressed data is lower than the established compression rate, compressing and outputting the compressed data using a TRUNC compression algorithm, wherein an amount of loss data in the RLEL compression algorithm and the TRUNC compression algorithm is adjusted.

23. The graphic image data compressor according to claim 22, wherein the RLEL algorithm compresses graphic image data regardless of a Least Significant Bit (LSB) of the graphic image data.

24. The graphic image data compressor according to claim 22, wherein the TRLUNC algorithm compresses graphic image data by truncating the LSB of the graphic image data.

* * * * *